United States Patent Office 2,719,793
Patented Oct. 4, 1955

2,719,793
SOUR CREAM DAIRY PRODUCT

Roscoe A. Page, Evanston, and Vern G. Lavalie, Chicago, Ill., assignors to Kraft Foods Company, Chicago, Ill., a corporation of Delaware No Drawing. Application May 17, 1951,
Serial No. 226,947

1 Claim. (Cl. 99—59)

The present invention relates, in general, to improvements in dairy products and, more particlarly, relates to a method for manufacturing a dairy product having substantially the same characteristics, e. g. body, taste, and color, as sour cream but being capable of retaining these characteristics over a prolonged period of time.

Sour cream provides a flavorful base for various dressings, sauces, and spreads for salads, meats, pastries, and the like, and has long been used in the culinary art in the preparation of many dishes and traditional foods. However, it is difficult to produce sour cream having uniform taste characteristics and satisfactory keeping qualities.

Sour cream may be prepared by merely allowing cream to stand at the proper temperature to permit the naturally occurring bacteria to sour the cream. While this method of preparation produces a sour cream satisfactory for certain cooking purposes, the product is usually non-homogeneous because of the separation of the whey from the curd and it is impossible to consistently produce a product of uniform flavor because of "off tastes" imparted to the cream by the growth of unwanted bacteria, yeasts and mold. As a result, this type of sour cream is generally unsatisfactory for most uses where good flavor, body and texture is essential and, consequently, a demand has arisen for a commercial sour cream of uniform quality.

In commercial practice, sour cream is usually prepared by pasteurizing and homogenizing cream and then adding a culture to the cream. Usually, the commercial process involves the step of pasteurizing cream containing about 18 per cent fat (e. g. heating the cream to around 175° F. for from 15 to 30 minutes), after which the cream is homogenized and cooled to around 70° F. A lactic acid producing culture is added to the homogenized cream to sour it, and the resulting sour cream is packed, incubated, and cooled prior to distribution. The body or viscosity of this product varies considerably, but when properly produced, this product is satisfactory for all cooking purposes. However, even when it is maintained under normal refrigerated conditions, it has a "shelf life" of only about four days. In other words, after this relatively short period of time, the sour cream deteriorates to a point where it is no longer satisfactory for merchandising. As a result of this short "shelf life," distribution of sour cream must be immediate and, as a consequence, merchandising costs are large.

The principal object of the present invention is to provide a process for making an improved homogeneous dairy product which has substantially the same characteristics as sour cream and which may be satisfactorily used in the preparation of all foods in which or on which sour cream has been used in the past. A more specific object of the invention is the provision of an improved method for manufacturing a sour cream-like product which will have a "shelf life" substantially greater than commercially produced sour cream and which is more economical to manufacture and merchandise than sour cream. Still other objects and advantages of the improved process will become apparent through reference to the following.

We have discovered that if the percentage of milk protein present in a sour cream or sour cream product is raised to over 3 per cent by weight, and preferably to about 3.5 per cent by weight, the product after souring can be homogenized and pasteurized to produce a cream product which can be stored for considerable lengths of time, which has a firm body, and which is not too susceptible to syneresis. The protein can be added to high fat cream, e. g. 18 per cent milk fat, before it is soured, and after the proper degree of acidity is reached, the product can be pasteurized and homogenized. As an alternative procedure, a mix containing a relatively low percentage of milk fat, e. g. 7–12 per cent by weight, is soured with a suitable culture and after the proper acidity is reached, a portion of the whey can be removed to increase the amount of protein present to over 3 per cent by weight.

According to the preferred method of practicing our improved process, a ripened liquid cream mix is prepared by heating cream having a fat content of from about 7 to 12 per cent (cream of this type contains between about 2.6 and 2.8 per cent protein), to a pasteurizing temperature for a period of time sufficient to effect pasteurization. The pasteurized cream is then homogenized to disperse the fat throughout the liquid, the homogenized cream being then cooled to a temperature of from about 60 to 80° F.

A suitable culture is added to the pasteurized cream and the cream is allowed to ripen until the whey which separates out has an acidity between about 0.7 and 0.9 per cent is produced. After the whey has reached the desired acidity, some of the whey is separated from the curd. This is preferably accomplished by heating the ripened cream to a temperature sufficient to "break" the viscosity of the mix and then effecting separation. In this connection, the ripened cream is preferably heated to a temperature higher than 135° F. for a period sufficient to pasteurize the mix but the mix should not be heated to a temperature above about 170° F. in order that the flavor and other characteristics of the mix are preserved. The curd and whey can be separated by filtration or by mechanical means.

The separation is effected to such a degree that a mixture results which contains between about 15 and 25 per cent by weight of milk fat (3.5–4.5 per cent protein). The resulting mixture is heated to a temperature of between 90° F. and 160° F.

The heated mixture is then homogenized at a pressure of over about 2500 pounds per square inch and is packaged (while at a temperature between about 100° and about 160° F.) into shipping containers. It is important to obtain a characteristic body to maintain the homogenizing pressure over the 2500 pounds minimum. Preferably, the homogenizing is accomplished in a single stage at a pressure of over 3500 pounds per square inch, but multiple stages may be employed if one of the stages has a pressure of 2500 pounds per square inch or over. It is also preferable that the mix be packaged while hot since the resulting product may lose some of its body if it is agitated after cooling. The temperature of the hot, homogenized mix may be maintained for a period of time sufficient to effect pasteurization.

After packaging, the product may be cooled and stored under normal refrigerated conditions. The resulting product is both homogeneous and uniform in color. Moreover, it has almost the identical characteristics of sour cream, but unlike home-made or commercially available sour cream has a very low bacteria, yeast, and mold count and a shelf life five or six times longer than that of presently available sour creams. As a result, the sour cream-like product of the invention has many advantages to the seller, as well as the purchaser, over either homemade or other sour creams. The improved sour cream-like product may be substituted for sour cream for cooking purposes, and may be used in the preparation of dressings and sauces of uniform body or as a base for blending with cheeses or other products.

In order to minimize syneresis of the sour cream-like product (i. e. contraction of the curd with a resultant exudation of whey) a suitable stabilizer may be added to the mix preferably prior to homogenization. In this connection, vegetable gums as locust bean gum, karaya gum, or tragacanth gum may be added, or Irish moss extract may be used.

Example I

As one specific example of our improved process, 100 pounds of cream containing 12 per cent fat and 2.60 per cent milk protein is pasteurized, homogenized, and then cooled to 70° F. A lactic acid starter is added to the cream, the cream being then allowed to ripen and sour until the acidity of the whey reached .8 per cent. The soured cream is then heated to 165° F. for 15 minutes to "break" viscosity of the mix and to pasteurize the product. The pasteurized mixture is then centrifuged. The resulting curd and whey are recovered from the separator. The curd and enough of the whey are mixed together to produce a mixture, containing about 18 per cent by weight of fat. On the basis of the 100 pounds of cream, 33.3 pounds of whey are removed and this increases the percentage of protein in the mixture to 3.48 per cent by weight.

This standardized mixture is stirred by hand, care being taken not to incorporate air into the mixture, and, during mixing, the temperature of the mixture is brought up to 145° F. The standardized mixture is then homogenized at a pressure of 4000 pounds per square inch in a single stage in a Manton-Gaulin valve-type homogenizer. The heated, homogenized product is filled while at a temperature of about 135° F. into shipping containers. The resulting product is placed under refrigeration and cooled to a temperature of about 45° F. When kept under refrigeration, the sour cream-like product has a shelf life of 20 days. The product is homogeneous and provides a highly satisfactory substitute for sour cream.

In order to provide a sour cream-like product of satisfactory texture and body, it is highly important that this mixing of the curd and whey be accomplished in a manner such that a minimum amount of air is drawn into the mixture. If any substantial amount of air is incorporated in the mix during mixing, it has been found that the texture and body of the final sour cream-like product are deleteriously affected, making it less satisfactory for merchandising purposes. A mechanical stirrer operated at low speed or hand mixing have been found satisfactory.

Example II

As another example of our process, 75 pounds of cream containing 18 per cent fat and 2.49 per cent protein is placed in a vat and warmed to 70° F. To this warmed cream there is added 3.7 pounds of skim milk powder which includes 1.29 pounds of lactose and 1.37 pounds of protein. The mixture of skim milk powder and cream is slowly agitated to effect the solution of the skim milk powder. The final mixture of cream and skim milk powder contains 4.23 per cent by weight of protein. The mixture is then pasteurized, homogenized, and a lactic acid starter is added. The cream is then allowed to ripen and the acidity of the whey reaches .8 per cent, the sour cream is then heated to pasteurization temperatures, e. g. 165° F. for 15 minutes. The pasteurized mixture is then homogenized in a Manton-Gaulin valve-type homogenizer. The heated homogenized product is then filled into suitable containers which are then placed under refrigeration. The product, when kept under refrigeration, has a shelf life of about 20 days and is homogeneous. The protein ratio of the cream may be increased by the method of Example I, by the addition of skim milk powder to the cream as described above, or by adding milk protein per se.

The foregoing processes may be easily and simply carried out and provide a product which has an extensive market. Moreover, the product has many commerical advantages to the seller and certain desirable characteristics for the buyer. Various features of the invention are defined by the following claim.

We claim:

The method for preparing a stable homogeneous fluid sour cream product which comprises pasteurizing cream having a fat content of from about 7 to 12 percent by weight and from about 2.6 to 2.9 percent by weight protein, homogenizing said cream, adding a lactic acid starter to said cream, ripening said cream to produce a mixture of curd and whey, said whey having an acidity of between about 0.7 and 0.9 percent, heating said ripened cream to about 165° F. to break and pasteurize said ripened cream, mechanically separating the curd and whey in said ripened cream, adding whey to said separated curd to provide a mixture of curd and whey having a protein content in excess of 3.0 percent by weight, mixing and heating said last named mixture to a temperature of about 145° F., and homogenizing said heated high protein-content mixture of curd and whey.

References Cited in the file of this patent

U. S. Dept. of Agriculture Bulletin No. 608, revised February 1932, published by U. S. Govt. Printing Office, Washington, D. C., 1943, "Cream," and cream "(Loaf)" cheese, pages 13 and 14.